No. 812,352. PATENTED FEB. 13, 1906.
J. MÜHLRAD.
LUBRICATION PIPE.
APPLICATION FILED MAY 24, 1905.
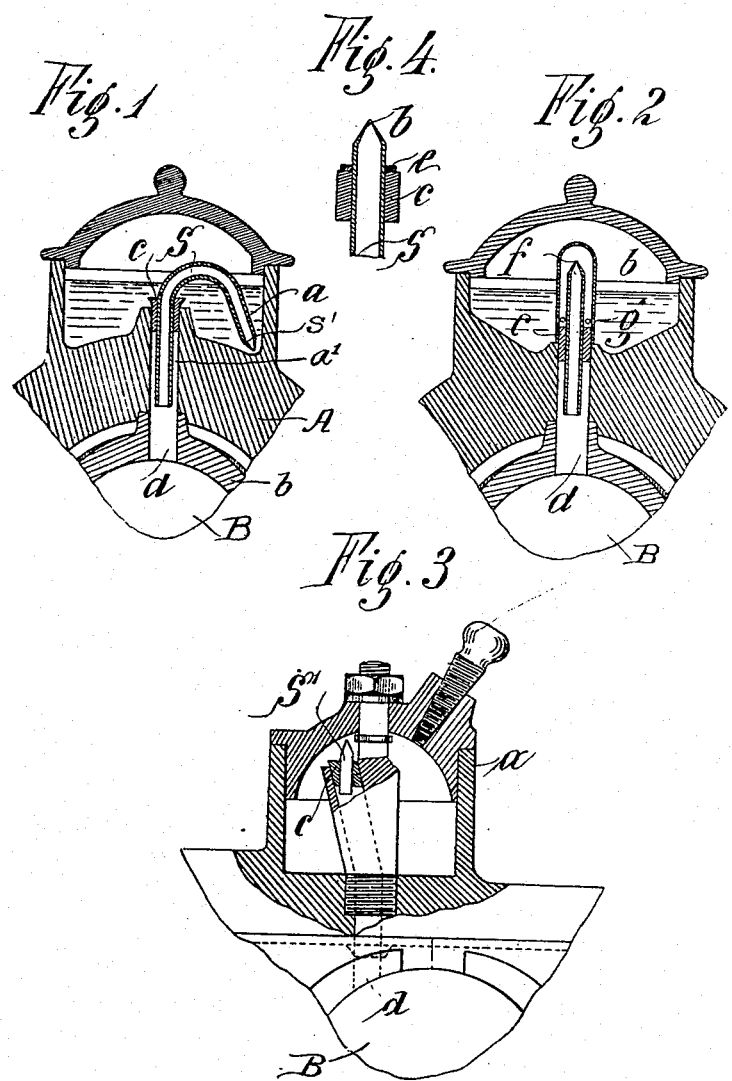

UNITED STATES PATENT OFFICE.

JOHANN MÜHLRAD, OF JASLO, AUSTRIA-HUNGARY.

LUBRICATION-PIPE.

No. 812,352.     Specification of Letters Patent.     Patented Feb. 13, 1906.

Application filed May 24, 1905. Serial No. 262,102.

*To all whom it may concern:*

Be it known that I, JOHANN MÜHLRAD, a subject of the Emperor of Austria-Hungary, residing at Jaslo, Galicia, Austria-Hungary, have invented a new and useful Improvement in Lubrication-Pipes, of which the following is a specification.

My invention relates to automatically-acting lubricators for shafts, axles, and the bearings thereof, and has for its primary object the provision of means whereby the supply of oil from a suitable receptacle to the shaft or bearing may be automatically regulated according to the speed of the shaft and turned on and shut off upon the starting and stopping of the shaft.

To this end my invention comprises, broadly, a vacuum-feed which is operated through the medium of a closed chamber in communication with the shaft and into which one end of a tube projects, the opposite end being contracted and communicating with a suitable oil-supply.

My invention will be fully illustrated in connection with the accompanying drawings and will be particularly pointed out in the appended claims.

In the drawings, Figure 1 illustrates the preferred embodiment of my invention. Fig. 2 shows a modified form of the device shown in Fig. 1. Fig. 3 is a further modified form; and Fig. 4 is a detail view of the tube, illustrating a structural modification of the same.

Like characters of reference designate similar parts throughout the different figures of the drawings.

In the preferred form a fragmentary view of a bearing A and its shaft B is shown. The bearing is provided with an oil cup or receptacle $a$, having a removable lid or cover, and a downwardly-opening bore $a'$, communicating with the interior of the bearing-box. The shaft B is provided with a journal-brass $b$, having a bore $d$ extending therethrough and adapted to register with the bore $a'$. In order to insure an effective and a relatively tight joint between the parts, the brass $b$ is provided with a projecting nipple adapted to fit into a complemental recess formed in the lower wall of the box A. It will be apparent from the foregoing and by reference to Fig. 1 that a continuously-free passage is provided between the box A and the shaft B, which is closed at its lower end by said shaft, the said passage constituting a vacuum-chamber. I provide a tube $s$, which is fixed in the bore $a'$ in any suitable manner to close the upper end thereof to the oil-cup. A convenient means for securing the tube in place consists in passing the same through a piece of cork or packing $c$, having an outer diameter adapted to fit snugly within the bore $a'$, as shown in Fig. 1. If it is desired, the pipe may be provided with an annular projecting flange $e$, as shown in Fig. 4, to insure an exact relation of the tube with the packing when the parts are fitted in place. The tube $s$ is slightly smaller in diameter than the bore $a'$ and projects downwardly therein some distance, while the opposite end is bent upon itself so that its outer end is closely adjacent to the lowest portion of the oil-cup. The purpose of this construction is to maintain communication between the end of the tube $s$ and the oil when the latter has reached a low stage. The outer end of said tube is contracted, as shown at $s'$, forming an inlet which under ordinary conditions should be approximately 0.1 to 0.4 millimeter in diameter.

The operation of the device is as follows: Rotation of the shaft B creates a vacuum in the vacuum-chamber formed by the bores $a'$ and $d$, which results in drawing the oil into the tube through its contracted opening $s'$ and delivering it upon the shaft B. As the speed of the shaft B increases or decreases the vacuum formed will vary and will result in the delivery of an amount of oil proportionate to the speed of the shaft. Further, when the operation ceases the vacuum will be disrupted and the delivery of oil will cease. It will be obvious that while the supply of lubricant will not be delivered immediately upon starting the shaft the latter will, from its previous operation, have been thoroughly lubricated, and the time elapsing between the starting of the shaft and the delivery of the supply of oil thereto will be comparatively slight. In cases where the connection between the journal-brass and the box A is such as to form an air-tight passage between the box and the shaft a relatively complete and active vacuum will result and the restricted opening $s'$ will prevent too great a supply of oil to the shaft B. On the other hand and under ordinary conditions, where the vacuum-chamber is not air-tight the vacuum will never be sufficiently effective to supply oil in excessive quantities. It will thus be seen that under the former conditions the opening $s'$ would necessarily be contracted a great deal, whereas under the latter conditions the contraction of said opening might be less.

One of the modified forms of the device of my invention is shown in Fig. 2, wherein the tube $s$ is inclosed in a second tube $f$, the latter being secured to the plug $c$. In this form the tube $f$ is provided with apertures $g$ for admitting the oil to the tube $f$.

Where the device of my invention is applied to bearings of cross-heads and the like which are in motion, it is merely necessary to project the tube $s$ into the oil-cup, inasmuch as the lubricant is thrown about the cup and caused to light upon portions of the tube $s$, whereupon it will be drawn in through the contracted inlet and delivered to the bearing-parts. This form of the device is shown in Fig. 3.

What I claim as my invention, and desire to secure by Letters Patent, is—

1. A device of the class described comprising an oil-receptacle, a shaft, and vacuum-controlled means communicating with the receptacle and delivering to the shaft whereby a flow of the lubricant is effected in proportion to the speed of the shaft.

2. A device of the class described comprising an oil-receptacle, a shaft, and a tube communicating with the receptacle and delivering to the shaft, said tube being restricted at its receiving end whereby a flow of the lubricant is effected in proportion to the speed of the shaft.

3. A device of the class described comprising an oil-receptacle, a shaft, a tube projecting into a vacuum-chamber communicating with the shaft and closed to the receptacle, said tube communicating at its opposite end with the receptacle and having said outer end contracted.

4. A device of the class described comprising a bearing-box provided with an oil-receptacle, a shaft, a tube projecting into a vacuum-chamber formed in said box, said chamber being closed to said receptacle and open to said shaft, said tube having a contracted inlet and being bent to bring said inlet in close proximity to the lower wall of said receptacle.

In testimony whereof I affix my signature in presence of two witnesses.

JOHANN MÜHLRAD.

Witnesses:
ALVESTO S. HOGUE,
IGOZ KUORSELMACHER.